United States Patent
Isobe

(10) Patent No.: US 8,225,834 B2
(45) Date of Patent: Jul. 24, 2012

(54) PNEUMATIC TIRE FOR HEAVY LOAD

(75) Inventor: Satoru Isobe, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 437 days.

(21) Appl. No.: 12/397,975

(22) Filed: Mar. 4, 2009

(65) Prior Publication Data

US 2009/0229722 A1    Sep. 17, 2009

(30) Foreign Application Priority Data

Mar. 11, 2008   (JP) ................................. 2008-061630

(51) Int. Cl.
    *B60C 9/20*    (2006.01)
(52) U.S. Cl. ......... 152/535; 152/531; 152/450; 152/527
(58) Field of Classification Search ............... 152/526, 152/527, 531, 535, 450
    See application file for complete search history.

(56) References Cited

U.S. PATENT DOCUMENTS

| 4,785,861 A | 11/1988 | Fujiwara |
| 5,637,162 A | 6/1997 | Rhyne et al. |
| 2001/0001403 A1 * | 5/2001 | Tsuruta et al. ................. 152/526 |
| 2008/0000566 A1 * | 1/2008 | Manno et al. .................. 152/527 |

FOREIGN PATENT DOCUMENTS

| EP | 0 202 788 A2 | 11/1986 |
| JP | A 5-185806 | 7/1993 |
| JP | 09-095107 | 4/1997 |
| JP | A 10-250314 | 9/1998 |
| JP | 2001-522748 | 11/2001 |
| JP | 2007-106152 | 4/2007 |
| WO | WO 99/24269 | 5/1999 |
| WO | WO 03/061991 A1 | 7/2003 |

* cited by examiner

*Primary Examiner* — Khanh P Nguyen
*Assistant Examiner* — Vishal I Patel
(74) *Attorney, Agent, or Firm* — Greer, Burns & Crain, Ltd.

(57) ABSTRACT

In a pneumatic tire for heavy load including a circumferentially-formed groove running in a tire circumferential direction on a surface of a tread part, when a pneumatic pressure equivalent to a normal inner pressure is applied with reference to a case where a pneumatic pressure equivalent to an inner pressure of kPa is applied, a radius growth in a tire radial direction at a crown center of the tread part and in the circumferentially-formed groove located at the most lateral side in a tire width direction is made to be less than 0.3%.

10 Claims, 6 Drawing Sheets

FIG.6

|  | LARGE | SMALL |
|---|---|---|
| USH/HB | RESISTANCE TO GROOVE CRACK IS IMPROVED AND DURABILITY OF BELT LAYER IS DETERIORATED | RESISTANCE TO GROOVE CRACK IS DETERIORATED AND DURABILITY OF BELT LAYER IS IMPROVED |
| WE/HB | RESISTANCE TO GROOVE CRACK IS DETERIORATED AND DURABILITY OF BELT LAYER IS IMPROVED | RESISTANCE TO GROOVE CRACK IS IMPROVED AND DURABILITY OF BELT LAYER IS DETERIORATED |
| WF/WE | RESISTANCE TO GROOVE CRACK IS DETERIORATED AND DURABILITY OF BELT LAYER IS IMPROVED | RESISTANCE TO GROOVE CRACK IS IMPROVED AND DURABILITY OF BELT LAYER IS DETERIORATED |

FIG.7

| | | | CONV1 | 1ST EX | 2ND EX | 3RD EX | 4TH EX |
|---|---|---|---|---|---|---|---|
| STANDARDIZED MAXIMUM LOAD(W) [kN] | | | 45.36 | 45.36 | 45.36 | 45.36 | 45.36 |
| CROSS SECTIONAL WIDTH OF CARCASS(WC) [mm] | | | 430 | 430 | 430 | 430 | 430 |
| 1ST BELT | WIDTH [mm] | | 321 | 340 | 340 | 340 | 340 |
| | ANGLE [°] | | 90 | 68 | 68 | 68 | 68 |
| | END [NUMBER OF ENDS/50mm] | | 18 | 22 | 22 | 22 | 22 |
| | WIRE FORCE [kN] | | 2.35 | 2.87 | 2.87 | 2.87 | 2.87 |
| 2ND BELT | WIDTH [mm] | | 368 | 375 | 375 | 375 | 375 |
| | ANGLE [°] | | 17 | 17 | 17 | 30 | 30 |
| | END [NUMBER OF ENDS/50mm] | | 24 | 22 | 22 | 19 | 19 |
| | WIRE FORCE [kN] | | 1.55 | 2.87 | 2.87 | 2.87 | 2.87 |
| 3RD BELT | WIDTH [mm] | | 277 | 285 | 255 | 285 | 285 |
| | ANGLE [°] | | 0 | 0 | 0 | 0 | 0 |
| | END [NUMBER OF ENDS/50mm] | | 26 | 22 | 22 | 18 | 25 |
| | WIRE FORCE [kN] | | 1.87 | 3.14 | 3.14 | 3.14 | 350 |
| 4TH BELT | WIDTH [mm] | | 346 | 350 | 350 | 350 | 350 |
| | ANGLE [°] | | -17 | -17 | -17 | -30 | -30 |
| | END [NUMBER OF ENDS/50mm] | | 24 | 22 | 22 | 19 | 19 |
| | WIRE FORCE [kN] | | 1.55 | 2.87 | 2.87 | 2.87 | 2.87 |
| 5TH BELT | WIDTH [mm] | | 307 | 315 | 315 | 315 | 315 |
| | ANGLE [°] | | -17 | -17 | -17 | -30 | -30 |
| | END [NUMBER OF ENDS/50mm] | | 18 | 19 | 19 | 19 | 19 |
| | WIRE FORCE [kN] | | 1.58 | 1.90 | 1.90 | 1.90 | 1.90 |
| SPECIFIED VALUE | DEFORMATION IN CROWN CENTER PART [%] | LESS THAN 0.3 | 0.38 | 0.17 | 0.17 | 0.17 | 0.17 |
| | DEFORMATION IN MOST LATERAL MAIN GROOVE PART [%] | LESS THAN 0.3 | 0.67 | 0.19 | 0.26 | 0.28 | 0.25 |
| | $\Sigma Li/W$ | 3.00~4.20 | 2.57 | 4.07 | 4.07 | 3.05 | 3.70 |
| | $\Sigma Mi/W$ | 1.80~2.60 | 1.50 | 2.55 | 2.55 | 1.81 | 1.81 |
| | $\Sigma Li/P$ | 0.20~0.25 | 0.14 | 0.22 | 0.22 | 0.17 | 0.20 |
| | $\Sigma Mi/P$ | 0.12~0.16 | 0.08 | 0.14 | 0.14 | 0.10 | 0.10 |
| | WB/WC | 0.6~0.75 | 0.64 | 0.66 | 0.59 | 0.66 | 0.66 |
| SPECIFIED VALUE | USH/HB | 0.48~0.52 | 0.46 | 0.49 | 0.49 | 0.49 | 0.49 |
| | WE/HB | 1.22~1.32 | 1.27 | 1.27 | 1.27 | 1.27 | 1.27 |
| | WF/WE | 0.63~0.69 | 0.72 | 0.65 | 0.65 | 0.65 | 0.65 |
| | WD/M | 0.44~0.46 | 0.45 | 0.45 | 0.45 | 0.45 | 0.45 |
| INDEX FOR DURABILITY | | | 100 | 120 | 105 | 104 | 110 |
| INDEX FOR RESISTANCE TO WIRE FATIGUE | | | 100 | 130 | 110 | 108 | 115 |
| INDEX FOR RESISTANCE TO UNEVEN ABRASION | | | 100 | 110 | 103 | 103 | 105 |

PNEUMATIC TIRE FOR HEAVY LOAD

BACKGROUND OF THE INVENTION

1. Field of the Invention

The present invention relates to a pneumatic tire for heavy load, and more specifically to a pneumatic tire for heavy load whose durability, resistance to a wire fatigue, and resistance to an uneven wear can be improved.

2. Description of the Related Art

In a pneumatic tire for heavy load, especially with a wide base and low aspect ratio (the aspect ratio being equal to or less than 70%, for example), a growth in a radius (a deformation in a tire radial direction) markedly occurs in a vicinity of a shoulder part on both sides of a tread part in a tire width direction, and the radius growth ranges unevenly in the tire width direction. This uneven radius growth causes deterioration in a durability of the tire and a resistance to a wire fatigue of a belt layer provided in an outer circumference of a carcass, and also in a resistance to an uneven wear of a shoulder rib and a shoulder block.

One conventional pneumatic tire for heavy load has a width equivalent to at least 80% of a maximum tire width in the tire width direction and includes at least two belt layers which crosses at an angle between 10 degrees and 45 degrees with respect to the tire circumferential direction and an additional layer which is formed by a reinforcing element provided between the belt layers and essentially parallel to the tire circumferential direction. In such a pneumatic tire for heavy load, the belt layers have a width larger than that of the additional layer by at least 16% of the maximum tire width in the tire width direction and are interlinked, on the way extended from the additional layer in the tire width direction, over a distance equivalent to at least 3.5% of the maximum tire width, and end parts of the belt layers in the tire width direction are separated by a rubber mix as disclosed in PCT National Publication No. 2001-522748, for example.

Another conventional pneumatic tire for heavy load makes an attempt to suppress an amount of the radius growth by specifying, with respect to ends in a minimum width of at least two wire layers which are substantially non-stretchable and arranged in the tire circumferential direction, a position of a circumferentially-formed groove provided between a position at a quarter of a tread part and an edge on the tread surface as disclosed in Japanese Patent Application Laid-Open No. H10-250314, for example.

Still another conventional pneumatic tire for heavy load makes an attempt to equalize an amount of the radius growth ranging in the tire width direction by specifying a carcass line as disclosed in Japanese Patent Application Laid-Open No. H5-185806, for example.

Still another conventional pneumatic tire for heavy load makes an attempt to suppress an amount of the radius growth by setting a total force, per unit width, of a belt layer in the tire circumferential direction as disclosed in Re-Publication No. of PCT application entering national phase 2003-61991, for example.

However, any of the conventional pneumatic tires for heavy load described above do not meet requirements for a durability, a resistance to a wire fatigue, and a resistance to an uneven wear as a pneumatic tire for heavy load with a wide base and low aspect ratio.

SUMMARY OF THE INVENTION

It is an object of the present invention to at least partially solve the problems in the conventional technology.

In a pneumatic tire for heavy load according to an aspect of the present invention, including a circumferentially-formed groove running in a tire circumferential direction on a surface of a tread part, when a pneumatic pressure equivalent to a normal inner pressure is applied to the tire with reference to a case where a pneumatic pressure equivalent to an inner pressure of 100 kPa is applied, a radius growth in a tire radial direction at a crown center of the tread part and in the circumferentially-formed groove located at a most lateral side in a tire width direction is less than 0.3%.

The pneumatic tire for heavy load may include: at least two crossing belts arranged at an angle not less than 10 degrees and not more than 30 degrees with respect to the tire circumferential direction; and at least one circumferential reinforcement layer arranged at an angle not less than zero degree and not more than five degrees with respect to the tire circumferential direction are provided at an outer side of a carcass layer in the tire radial direction.

In the pneumatic tire for heavy load, a summation $\Sigma Li$ [kN] of a circumferential force of the crossing belts and the circumferential reinforcement layer with respect to a normal load W [kN] may be set within a range expressed by $3.00 \leq \Sigma Li/W \leq 4.20$.

In the pneumatic tire for heavy load, a summation $\Sigma Mi$ [kN] of the circumferential force of the crossing belts with respect to the normal load W [kN] may be set within a range expressed by $1.80 \leq \Sigma Mi/W \leq 2.60$.

In the pneumatic tire for heavy load, a summation $\Sigma Li$ [kN] of a circumferential force of the crossing belts and the circumferential reinforcement layer with respect to a normal inner pressure P [kPa] may be set within a range expressed by $0.20 \leq \Sigma Li/P \leq 0.25$.

In the pneumatic tire for heavy load, a summation $\Sigma Mi$ [kN] of the circumferential force of the crossing belts with respect to the normal inner pressure P [kPa] may be set within a range expressed by $0.12 \leq \Sigma Mi/P \leq 0.16$.

In the pneumatic tire for heavy load, a maximum width WB of the circumferential reinforcement layer in the tire width direction with respect to a maximum width WC of the carcass layer in the tire width direction may be set within a range expressed by $0.60 \leq WB/WC \leq 0.75$ in a cross sectional view, along a meridional direction, of the tire to which the pneumatic pressure equivalent to the normal inner pressure is applied.

In the pneumatic tire for heavy load, a total width in the tire width direction may be set within a range not less than 300 mm.

In the pneumatic tire for heavy load, a nominal dimension for an aspect ratio may be set within a range not more than 70%.

In the pneumatic tire for heavy load, when a straight line drawn from a position of a rim height FH in the tire width direction is treated as an X axis and a straight line drawn in the tire radial direction through the crown center is treated as a Y axis, a nominal dimension S for an aspect ratio, a distance USH in the Y-axis direction from a maximum width position T of a carcass layer in the tire width direction to an inflection point Q of the carcass layer, a distance HB from the X axis to a top R of the carcass layer at the crown center, a distance WE from the Y axis to the maximum width position T of the carcass layer in the tire width direction, and a distance WF from the Y axis to the inflection point Q of the carcass layer may have a relationship expressed by $0.48 \leq USH/HB \leq 0.52$, a relationship expressed by $5.52 S^2 \times 10^{-5} - 2.407 S \times 10^{-2} + 2.29 \leq WE/HB \leq 5.52 S^2 \times 10^{-5} - 2.407 S \times 10^{-2} + 2.39$, and a relationships expressed by $-1.1312 S^2 \times 10^{-4} + 5.822 S \times 10^{-3} + 0.62 \leq WF/WE \leq -1.1312 S^2 \times 10^{-4} + 5.822 S \times 10^{-3} + 0.68$.

In the pneumatic tire for heavy load, a width WD as a half of a base width of the tire and a nominal dimension M for a cross sectional width of the tire may have a relationship expressed by $0.44 \leq WD/M \leq 0.46$.

In the pneumatic tire for heavy load, a curvature radius RA of a carcass layer at a position on an outer side in the tire width direction from a belt layer which includes at least two crossing belts and at least one circumferential reinforcement layer and the distance USH from the maximum width position T of the carcass layer in the tire width direction to the inflection point Q of the carcass layer in the Y axis direction may have a relationship expressed by $0.95 \leq RA/USH \leq 1.05$.

In the pneumatic tire for heavy load, a curvature radius RA of a carcass layer at a position on an outer side in the tire width direction from a belt layer which includes at least two crossing belts and at least one circumferential reinforcement layer and the distance USH from the maximum width position T of the carcass layer in the tire width direction to the inflection point Q of the carcass layer in the Y axis direction may have a relationship expressed by $0.95 \leq RA/USH \leq 1.05$.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is an explanatory view showing effects on the pneumatic tire for heavy load according to the second embodiment of the present invention; and FIG. 7 shows a result of performance tests for the pneumatic tires for heavy load according to the embodiments of the present invention.

DETAILED DESCRIPTION OF THE PREFERRED EMBODIMENTS

Exemplary embodiments of a pneumatic tire for heavy load according to the present invention will be explained in detail below with reference to the accompanying drawings. It should be noted that: the present invention is not limited by the embodiments; constituents of the embodiments may include an element which is replaceable or can be easily replaced by those skilled in the art, or is substantially identical to a known element in the art; and various modifications set forth in the embodiments can be arbitrarily combined within a scope inherently presented to those skilled in the art.

First Embodiment

Figure 1:
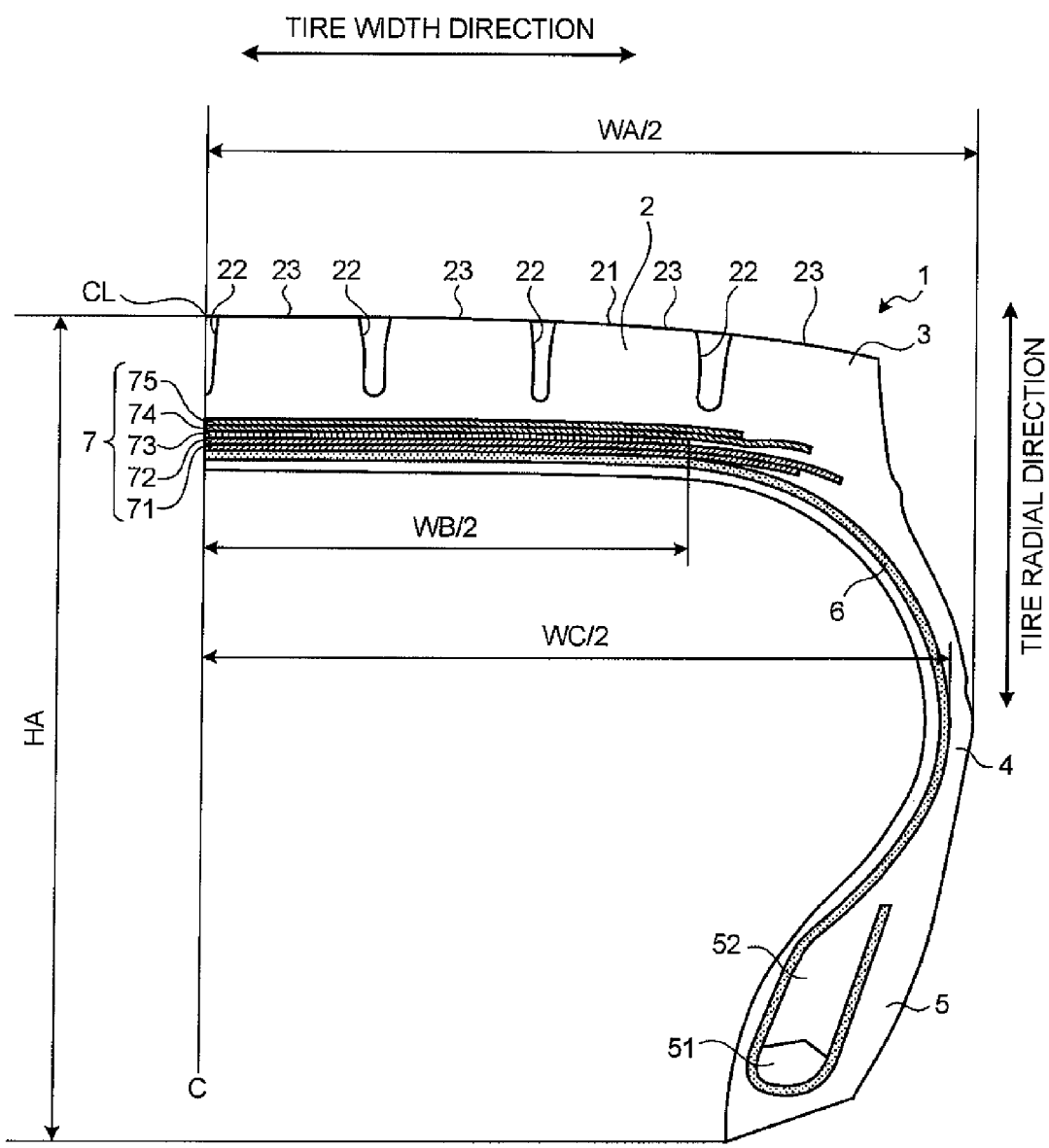
FIG. 1 is a cross sectional view, along a meridional direction, of a pneumatic tire for heavy load according to a first embodiment of the present invention.
Figure 2:
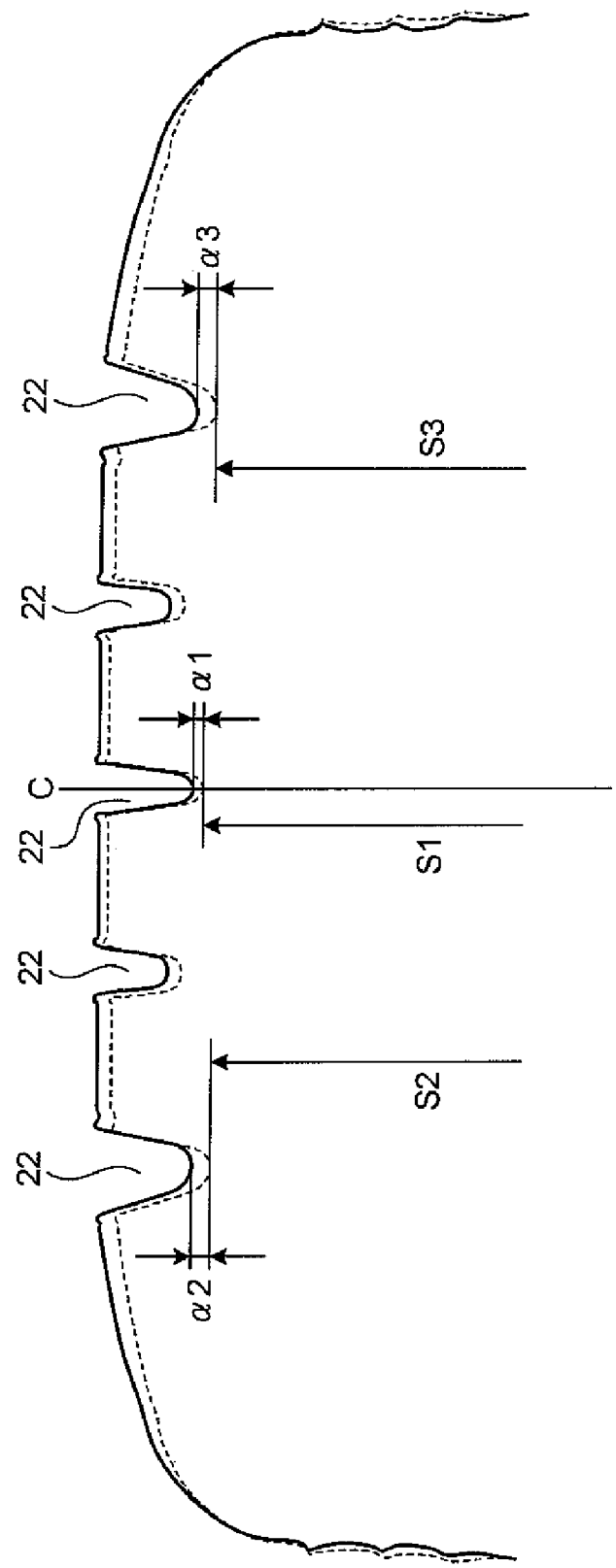
FIG. 2 is a schematic view of a radius growth in the pneumatic tire for heavy load shown in FIG. 1.

FIG. 1 is a cross sectional view, along a meridional direction, of a pneumatic tire for heavy load according to a first embodiment of the present invention and FIG. 2 is a schematic view of a radius growth in the pneumatic tire for heavy load shown in FIG. 1.

A pneumatic tire for heavy load 1 according to the first embodiment is configured to be virtually symmetric with respect to a tire equatorial plane C as a center. The tire equatorial plane C is a flat surface which is orthogonal to a rotation axis (not shown) of the pneumatic tire for heavy load 1 and crosses a center of a tire width of the pneumatic tire for heavy load 1. Besides, a tire equatorial line means a line which is present on the tire equatorial plane C along a circumferential direction of the pneumatic tire for heavy load 1. Since the pneumatic tire for heavy load 1 to be explained below is configured to be virtually symmetric with respect to the center, i.e., the tire equatorial plane C, only one side of the symmetry with respect to the tire equatorial plane C as the center is shown in FIG. 1, the only one side will be explained, and an explanation for the other side of the symmetry will be omitted.

Here, the tire circumferential direction indicates a rotating direction around the rotation axis (not shown) as a center axis of the pneumatic tire for heavy load 1 in the explanation below. Furthermore, the tire width direction indicates a direction parallel to the rotation axis, an inner side in the tire width direction indicates a side to the tire equatorial plane C in the tire width direction, and an outer side in the tire width direction indicates a side away from the tire equatorial plane C in the tire width direction. Moreover, a tire radial direction indicates a direction orthogonal to the rotation axis, an inner side in the tire radial direction indicates a side to the rotation axis in the tire radial direction, and an outer side in the tire radial direction indicates a side away from the rotation axis in the tire radial direction.

As shown in FIG. 1, the pneumatic tire for heavy load 1 has a configuration including a tread part 2, a shoulder part 3 on each side of the tread part 2, and a side wall part 4 and a bead part 5 which are present in series continuously from the shoulder 3. Furthermore, the pneumatic tire for heavy load 1 includes a carcass layer 6 and a belt layer 7.

The tread part 2 is a part exposed to an outside of the pneumatic tire for heavy load 1 and a surface thereof forms a contour of the pneumatic tire for heavy load 1. A tread surface 21 is formed on an outer circumferential surface of the tread part 2, i.e., on a landing surface which is to be in contact with a road surface in driving. In this tread surface 21, a plurality of circumferentially-formed grooves 22 which run in the tire circumferential direction and ribs 23 which are formed, as a plurality of land parts, by being zoned by the circumferentially-formed grooves 22 are formed. In the first embodiment, seven circumferentially-formed grooves 22 including a groove at a position of a crown center CL which is located at the center in the tire width direction and on the tire equatorial plane C of the tread part 2 are formed, and eight ribs 23 are formed by these circumferentially-formed grooves 22.

The shoulder part 3 is a part located at both outer sides of the tread part 2 in the tire width direction. Besides, the side wall part 4 is a part exposed towards both outer sides in the width direction in the pneumatic tire for heavy load 1. Furthermore, the bead part 5 has a bead core 51 and bead filler 52. The bead core 51 is formed by winding a bead wire as a steel wire in a ring shape. The bead filler 52 is arranged in a space which is formed by folding back, at a position of the bead core 51, the carcass layer 6 towards the outer side in the tire width direction.

The carcass layer 6 is a wire layer formed by a steel or an organic filament covered with a rubber and forms a framework of the pneumatic tire for heavy load 1 with the wire arranged, in a manner of being orthogonal to the tire equatorial line of the pneumatic tire for heavy load 1, along the circumferential direction of the pneumatic tire for heavy load 1. The carcass layer 6 spans a range from the tread part 2 to the bead core 51 of the bead part 5 via the shoulder parts 3 and the side wall parts 4 on both sides of the tread part 2 in a toroidal shape.

The belt layer 7 is provided at the outer side in the radial direction from the carcass layer 6 in the tread part 2. The belt layer 7 has laminated layers of a plurality of belts each of which is a wire layer formed by a steel or an organic filament covered with a rubber, and the belt layer 7 covers the carcass layer 6 along the tire circumferential direction. The belt layer 7 in the first embodiment has a structure including five layers of a first belt 71, a second belt 72, a third belt 73, a fourth belt 74, and a fifth belt 75 which are laminated in series from the outer side of the carcass layer 6 to the outer side in the tire radial direction. The second belt 72 and the fourth belt 74 are arranged so that the wires covered with a rubber have an angle not less than 10 degrees and not more than 30 degrees with respect to the tire circumferential direction, i.e., the tire equatorial line. Besides, the second belt 72 and the fourth belt 74 form crossing belts arranged so that the wires, having the specified angle with respect to the tire circumferential direction, of the laminated belts mutually intersect with each other. In addition, the third belt 73 forms a so-called circumferential reinforcement layer: which is arranged so that the wire covered with a rubber has an angle not less than zero degree and not more than five degrees with respect to the tire circumferential direction, i.e., the tire equatorial line; as we say, which is arranged practically with an angle of zero degree with respect to the tire circumferential direction. Though the circumferential reinforcement layer is explained as the third belt 73 between the crossing belts (the second belt 72 and the fourth belt 74), the circumferential reinforcement layer may be provided at the outer side or the inner side from the crossing belts in the tire radial direction.

Besides, the pneumatic tire for heavy load 1 according to the first embodiment is intended for a pneumatic radial tire for heavy load having a total width WA of not less than 300 mm in the tire width direction and an aspect ratio of not more than 70%. Here, the aspect ratio indicates a ratio of a tire height HA to the total width WA in the tire width direction as shown in FIG. 1. The total width WA in the tire width direction is a part which has the widest width in the tire width direction in the pneumatic tire for heavy load 1 and represents a distance between the most lateral parts in the both side wall parts 4 in the tire width direction, i.e., a distance between the farthest parts from the tire equatorial plane C in the pair of side wall parts 4. Besides, the tire height HA is a cross sectional height of the tire from an inner edge of the bead part 5 in the tire radial direction (a rim base position) to the crown center CL along the tire radial direction. In FIG. 1, the pneumatic tire for heavy load 1 according to the first embodiment only presents one side from the tire equatorial plane C as the center and the total width WA in the tire width direction is shown as WA/2 which indicates a half of the total width WA.

When a pneumatic pressure equivalent to a normal inner pressure is applied to the pneumatic tire for heavy load 1 described above with reference to a case where a pneumatic pressure equivalent to an inner pressure of 100 kPa is applied, a growth in a radius (a deformation) towards the tire radial direction at the crown center CL of the tread part 2 and in the circumferentially-formed groove 22 located at the most lateral side in the tire width direction becomes less than 0.3%. The radius growth (deformation) is preferably not more than 0.28% and more preferably not more than 0.25%.

As shown in FIG. 2, the radius growth (deformation) in the pneumatic tire for heavy load 1 described above is expressed by a grown dimension in the tire radial direction when the pneumatic pressure equivalent to the normal inner pressure is applied (this case being shown by a solid line) with respect to a dimension in the tire radial direction when the pneumatic pressure equivalent to the inner pressure of 100 pKa is applied (this case being shown by a broken line). Specifically as for the crown center CL, with respect to a dimension S1 to a groove bottom in the tire radial direction when the pneumatic pressure equivalent to the inner pressure of 100 kPa is applied, a growth $\alpha 1$ in the tire radial direction when the pneumatic pressure equivalent to the normal inner pressure is applied satisfies a relationship expressed by $\alpha 1/S1 < 0.03$ in the circumferentially-formed groove 22 located at the crown center CL. Here, when the circumferentially-formed groove 22 is not provided at the crown center CL, a radius growth (deformation) in the tire radial direction on the tread surface 21 at the crown center CL satisfies "less than 0.3%". Besides, as for the circumferentially-formed groove 22 located at the most lateral side in the tire width direction, with respect to dimensions S2 and S3 each representing a distance to a bottom of the corresponding groove in the tire radial direction when the pneumatic pressure equivalent to the inner pressure of 100 kPa is applied, growths $\alpha 2$ and $\alpha 3$ in the tire radial direction respectively in the two circumferentially-formed grooves 22 located at the most lateral sides in the tire width direction when the pneumatic pressure equivalent to the normal inner pressure is applied satisfy a relationship expressed by $[(\alpha 2+\alpha 3)/(S2+S3)] < 0.03$.

It should be noted that the normal inner pressure represents the "maximum pneumatic pressure" specified by the Japan Automobile Tyre Manufacturers Association, Inc. (JATMA), a maximum value of the "TIRE LOAD LIMITS AT VARIOUS COLD INFLATION PRESSURES" specified by the Tire and Rim Association, Inc. (TRA), or the "INFLATION PRSSURES" specified by the European Tyre and Rim Technical Organisation (ETRTO).

Thus, since the radius growth (deformation) in the tire radial direction at the crown center CL of the tread part 2 and in the circumferentially-formed groove 22 located at the most lateral side in the tire width direction is made to be less than 0.3% in the pneumatic tire for heavy load 1 according to the first embodiment, the radius growth ranges almost evenly in the tire width direction. Therefore, an occurrence of a belt edge separation under a condition of a long-term use with high pressure and heavy load can be reduced even in a pneumatic tire for heavy load with a wide base and low aspect ratio (the aspect ratio being not more than 70% and the total width in the tire width direction being not less than 300 mm). As a result of this, a durability and a resistance to a wire fatigue can be improved up to a level comparable to a pneumatic tire for heavy load which has a standard size with an aspect ratio exceeding 70%. In addition, the radius growth ranges almost evenly in the tire width direction at the crown center CL and in the circumferentially-formed groove 22 located at the most lateral side in the tire width direction, so that a resistance to an uneven wear can also be improved.

A specific structure which allows satisfying the requirement, i.e., less than 0.3% for the radius growth (deformation) in the tire radial direction at the crown center CL of the tread part 2 and in the circumferentially-formed groove 22 located at the most lateral side in the tire width direction includes in the belt layer 7: crossing belts (the second belt 72 and the fourth belt 74) arranged at an angle not less than 10 degrees and not more than 30 degrees with respect to the tire circumferential direction; and the circumferential reinforcement layer (the third belt 73) arranged at an angle not less than zero degree and not more than five degrees with respect to the tire circumferential direction. Here, to satisfy the requirement, i.e., less than 0.3% for the radius growth (deformation) in the tire radial direction, it is only necessary that at least two crossing belts (72 and 74) arranged at an angle not less than 10 degrees and not more than 30 degrees with respect to the tire circumferential direction are provided and that at least one circumferential reinforcement layer (73) arranged at an angle not less than zero degree and not more than five degrees with respect to the tire circumferential direction is provided. Besides, it is more preferable that the circumferential reinforcement layer (73) is provided in a manner of being sandwiched between the at least two crossing belts (72 and 74).

With this belt layer 7, the radius growth (deformation) in the tire radial direction at the crown center CL of the tread part 2 and in the circumferentially-formed groove 22 located at the most lateral side in the tire width direction can be made to be less than 0.3% by providing a constrictive force to the carcass layer 6 to enhance its rigidity.

Besides, in making the radius growth (deformation) in the tire radial direction less than 0.3% at the crown center CL of the tread party 2 and in the circumferentially-formed groove 22 located at the most lateral side in the tire width direction in the pneumatic tire for heavy load 1 according to the first embodiment, it is preferable that a summation $\Sigma Li$ [kN] of a circumferential force of the crossing belts (72 and 74) and the circumferential reinforcement layer (73) with respect to a normal load W [kN] is set within a range expressed by $3.00 \leq \Sigma Li/W \leq 4.20$.

In other words, the radius growth (deformation) in the tire radial direction can be made to be less than 0.3% by improving the circumferential force of the belt layer 7. The circumferential force means a force of a wire in the tire circumferential direction and is expressed by (a wire force against a rupture)×[number of wire ends (number of ends/50 [mm])]× $(\cos[\text{wire angle}]^2)$. Therefore, it is only necessary to improve the against-rupture wire force, increase the number of wire ends, and make the wire angle with respect to the tire circumferential direction small for improving the circumferential force of the belt layer 7. The against-rupture wire force is improved by, for example, making a diameter of the wire of at least one of the circumferential reinforcement layer (73) and the crossing belts (72 and 74) large, using a wire material having a large force against a rupture, or increasing an amount of a contained carbon of the organic filament wire. Besides, as for the number of wire ends, it is only necessary to increase the number of wires per 50 mm of the crossing belts (72 and 74) and the circumferential reinforcement layer (73). In addition, as for the wire angle, it is only necessary to make the wire angle of the crossing belts (72 and 74) and the circumferential reinforcement layer (73) with respect to the tire circumferential direction small. The range expressed by $3.00 \leq \Sigma Li/W \leq 4.20$ can be obtained by adjusting the against-rupture wire force, the number of wire ends, or the wire angle in the manner described above. The durability is deteriorated when a value for the "$\Sigma Li/W$" falls below 3.00, and a weight of the tire as well as a manufacturing cost increase when the value for the "$\Sigma Li/W$" exceeds 4.20.

Furthermore, when the range expressed by $3.00 \leq \Sigma Li/W \leq 4.20$ is satisfied, it is more preferable that a summation $\Sigma Mi$ [kN] of the circumferential force of the crossing belts (72 and 74) with respect to the normal load W [kN] is set within a range expressed by $1.80 \leq \Sigma Mi/W \leq 2.60$ in improving the circumferential force in the entirety of the belt layer 7.

It should be noted that the normal load represents the "maximum load capacity (maximum load)" specified by the JATMA, a maximum value of the "TIRE LOAD LIMITS AT VARIOUS COLD INFLATION PRESSURES" specified by the TRA, or the "LOAD CAPACITY" specified by the ETRTO.

Besides, it is preferable in the pneumatic tire for heavy load 1 according to the first embodiment that the summation $\Sigma Li$ [kN] of the circumferential force of the crossing belts (72 and 74) and the circumferential reinforcement layer (73) with respect to a normal inner pressure P [kPa] is set within a range expressed by $0.20 \leq \Sigma Li/P \leq 0.25$. The durability is deteriorated when a value for the "$\Sigma Li/P$" falls below 0.20, and a weight of the tire as well as a manufacturing cost increase when the value for the "$\Sigma Li/P$" exceeds 0.25.

Furthermore, when the range expressed by $0.20 \leq \Sigma Li/P \leq 0.25$ is satisfied, it is more preferable that the summation $\Sigma Mi$ [kN] of the circumferential force of the crossing belts (72 and 74) with respect to the normal inner pressure P [kPa] is set within a range expressed by $0.12 \leq \Sigma Mi/P \leq 0.16$ in improving the circumferential force in the entirety of the belt layer 7.

Besides, it is preferable in the pneumatic tire for heavy load 1 according to the first embodiment that a maximum width WB of the circumferential reinforcement layer (73) in the tire width direction with respect to a maximum width WC of the carcass layer 6 in the tire width direction is set within a range expressed by $0.60 \leq WB/WC \leq 0.75$ in the cross sectional view, along a meridional direction, of the tire to which the pneumatic pressure equivalent to the normal inner pressure is applied, as shown in FIG. 1. With such a configuration, the radius growth (deformation) in the tire radial direction in an area from the crown center CL to the circumferentially-formed groove 22 located at the most lateral side in the tire width direction can be made to be evenly less than 0.3% and the resistance to an uneven wear can further be improved.

The maximum width WB of the circumferential reinforcement layer (73) in the tire width direction represents a distance between both ends of the circumferential reinforcement layer (73) in the tire width direction. Besides, the maximum width WC of the carcass layer 6 in the tire width direction represents a distance between the most lateral parts which have the largest width in the carcass layer 6 in the tire width direction and are located in the both side wall parts 4 on both sides in the tire width direction, i.e., a distance between the farthest parts from the tire equatorial plane C. It should be noted that since the pneumatic tire for heavy load 1 according to the first embodiment in FIG. 1 only presents one side from the tire equatorial plane C as the center, the maximum width WB of the circumferential reinforcement layer (73) in the tire width direction is shown as WB/2 which indicates a half of the maximum width WB and the maximum width WC of the carcass layer 6 in the tire width direction is shown as WC/2 which indicates a half of the maximum width WC.

Second Embodiment

The pneumatic tire for heavy load 1 according to the first embodiment described above is more preferably configured in a way to be described below to improve the durability, the resistance to a wire fatigue, and the resistance to an uneven wear.

Figure 3:
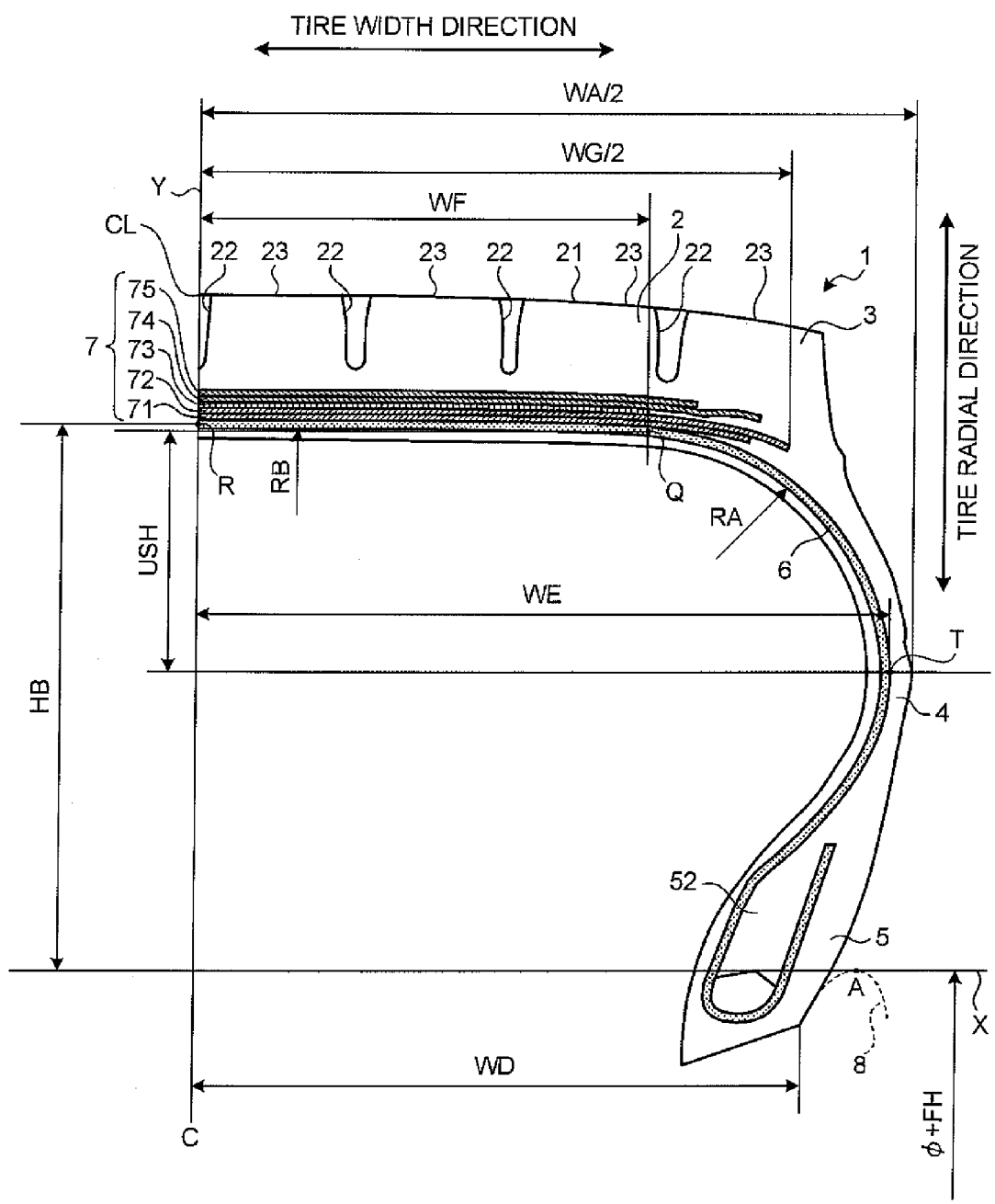
FIG. 3 is a cross sectional view, along a meridional direction, of a pneumatic tire for heavy load according to a second embodiment of the present invention.
Figure 4:
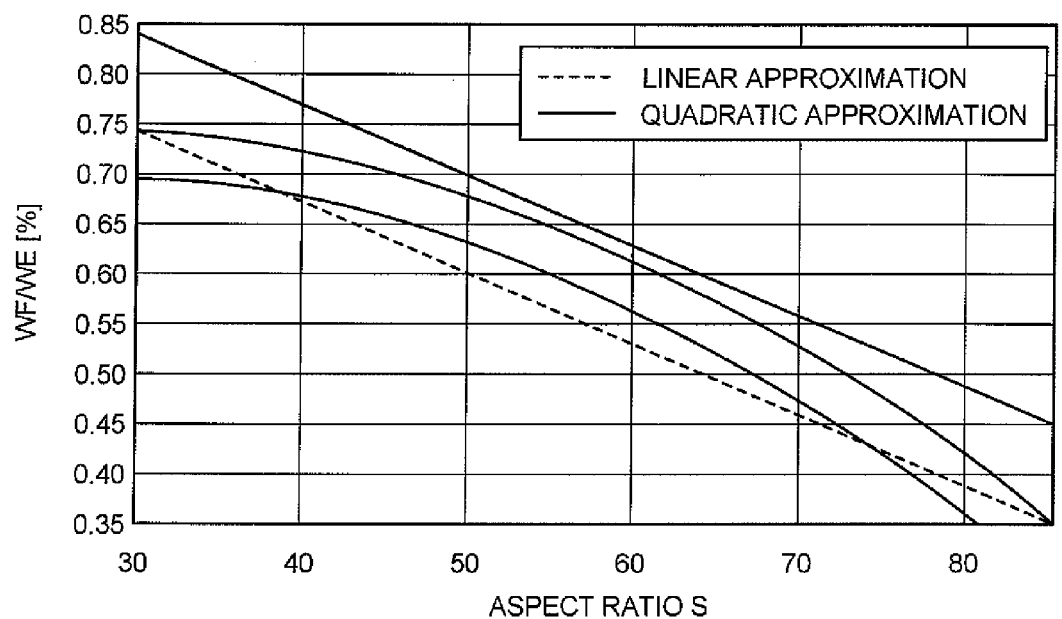
FIG. 4 is a graph showing a difference in each aspect ratio of the pneumatic tire for heavy load according to the second embodiment of the present invention.
Figure 5:
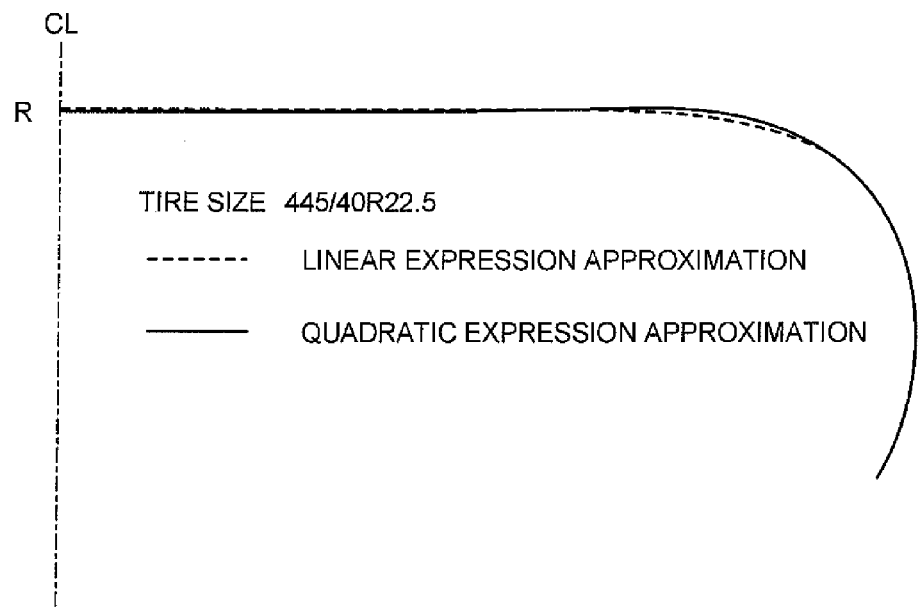
FIG. 5 is an explanatory view showing a carcass line of the pneumatic tire for heavy load according to the second embodiment of the present invention.

FIG. 3 is a cross sectional view, along a meridional direction, of a pneumatic tire for heavy load according to a second embodiment of the present invention, FIG. 4 is a graph showing a difference in each aspect ratio of the pneumatic tire for heavy load according to the second embodiment of the present invention, FIG. 5 is an explanatory view showing a carcass line of the pneumatic tire for heavy load according to the second embodiment of the present invention, and FIG. 6 is an explanatory view showing effects on the pneumatic tire for heavy load according to the second embodiment of the present invention. It should be noted that a part used in common with the first embodiment will be assigned with a common reference symbol and an explanation for the common part will not be repeated in the second embodiment explained below.

In the pneumatic tire for heavy load 1 according to the second embodiment, each dimension of the tire is specified based on a cross sectional view, along a meridional direction, of the tire when the tire is retained in a vulcanizing mold. Without a limitation to this, each dimension of the tire may be specified based on a cross sectional view, along a meridional direction, of the tire when the tire is retained alone so that a base width of the tire becomes not less than 100% and not more than 120% of a width of an application rim, for example. Here, a shape of the alone tire is a contour of the tire before being assembled to an application rim 8. The shape of the alone tire is virtually equivalent to a shape of the tire in the vulcanizing mold (a shape of the tire right before being ejected from the vulcanizing mold). Besides, a designed dimension of the tire is generally specified based on the tire shape in mold. In other words, the tire shape in the vulcanizing mold is virtually equivalent to the shape of the alone tire before being assembled to the application rim 8.

As shown in FIG. 3, a virtual line of the application rim (rim flange part of a wheel) 8 is drawn and a straight line drawn in the tire width direction from a position of a rim height FH (a most lateral point A of the rim flange part in the tire radial direction) is treated as an X axis in the cross sectional view, along a meridional direction, of the tire. Besides, a straight line drawn in the tire radial direction through the crown center CL of the tire is treated as a Y axis (a center axis of the tire).

Next, a width WD as a half of a base width of the tire, a distance WE from the Y axis to a maximum width position T of the carcass layer 6 in the tire width direction, and a distance WF from the Y axis to an inflection point Q of the carcass layer 6 are determined. In addition, a distance HB from the position A of the rim height FH to a top R of the carcass layer 6 at the crown center CL is determined.

Here, the application rim represents the "standard rim" specified by the JATMA, the "Design Rim" specified by the TRA, or the "Measuring Rim" specified by the ETRTO. Besides, the rim height FH is specified by a height of the rim flange part based on a rim radius $\Phi$ of the wheel.

Besides, the inflection point Q of the carcass layer 6 is defined by a position from which the inflection of the carcass layer 6 towards the inner side in the tire radial direction originates in observing a change in a curvature radius of the carcass layer 6 from the crown center CL to the outer side in the tire width direction in the cross sectional view, along a meridional direction, of the tire. Specifically, the inflection point Q of the carcass layer 6 is present within a range where a curvature radius RA of the carcass layer 6 at an outer position from the belt layer 7 in the tire width direction and a curvature radius RB of the carcass layer 6 at an inner position from the belt layer 7 (at the side of the crown center CL) in the tire width direction fulfill a relationship expressed by $1\% \leq RA/RB \leq 10\%$. Moreover, the inflection point Q may be defined as a point where an arc which is obtained by approximating the carcass line in the center area of the tread part exfoliates from this carcass line.

The pneumatic tire for heavy load 1 according to the second embodiment is characterized in that predetermined dimensional ratios USH/HB, WE/HB, and WF/WE are specified by a predetermined quadratic approximation in the cross sectional shape (carcass line) of the carcass layer 6 in the cross sectional view, along a meridional direction, of the tire.

Specifically, as shown in FIG. 3, a distance USH in the Y-axis direction from the maximum width position T of the carcass layer 6 in the tire width direction to the inflection point Q of the carcass layer 6 and the distance HB from the X axis to the top R of the carcass layer 6 at the crown center CL have a relationship expressed by $0.48 \leq USH/HB \leq 0.52$. Besides, a nominal dimension S for the aspect ratio of the tire, the distance WE from the Y axis to the maximum width position T of the carcass layer 6 in the tire width direction, and the distance HB have a relationship expressed by $5.52S^2 \times 10^{-5} - 2.407S \times 10^{-2} + 2.29 \leq WE/HB \leq 5.52S^2 \times 10^{-5} - 2.407S \times 10^{-2} + 2.39$. In addition, the nominal dimension S for the aspect ratio, the distance WF from the Y axis to the inflection point Q of the carcass layer 6, and the distance WE have a relationship expressed by $-1.1312S^2 \times 10^{-4} + 5.822S \times 10^{-3} + 0.62 \leq WF/WE \leq -1.1312S^2 \times 10^{-4} + 5.822S \times 10^{-3} + 0.68$.

Since the cross sectional shape (carcass line) of the carcass layer 6 is made to be appropriate in the pneumatic tire for heavy load 1, a shape change of the circumferentially-formed groove 22 (especially the circumferentially-formed groove 22 located at the most lateral side in the tire width direction) in the alone tire state and in an inflated state is reduced. Therefore, when the tire is assembled to the rim and a pneumatic pressure is applied to the tire, the bottom of the circumferentially-formed groove 22 does not easily expand. By this, the tire has advantages that a deformation generated in the bottom of the circumferentially-formed groove 22 is reduced and an occurrence of a groove crack is suppressed.

Besides, since the ratios WE/HB and WF/WE are defined by a predetermined quadratic approximation, the cross sectional shape of the carcass layer 6 is made to be appropriate with high precision compared to a configuration of defining the ratios WE/HB and WF/WE by a linear approximation (see FIG. 5). Specifically, the carcass line in the vicinity of the bottom of the circumferentially-formed groove 22 is at a higher position (located outward in the tire radial direction) in the quadratic approximation than in the linear approximation. Then, the shape change of the circumferentially-formed groove 22 in the alone tire state and in the inflated state is effectively reduced and a deformation generated in the bottom of the circumferentially-formed groove 22 is reduced. Thus, a performance of the tire concerning a resistance to a groove crack is improved.

In general, the ratio USH/HB, the ratio WE/HB, and the ratio WF/WE have a relationship below with the resistance of the tire to a groove crack and the durability of the belt layer 7 (see FIG. 6). First of all, when the ratio USH/HB increases (large), the resistance to a groove crack tends to be improved and the durability of the belt layer 7 tends to be deteriorated. In contrast, when the ratio USH/HB decreases (small), the resistance to a groove crack tends to be deteriorated and the durability of the belt layer 7 tends to be improved. Besides, when the ratio WE/HB increases (large), the resistance to a groove crack tends to be deteriorated and the durability of the belt layer 7 tends to be improved. In contrast, when the ratio WE/HB decreases (small), the resistance to a groove crack tends to be improved and the durability of the belt layer 7 tends to be deteriorated. Still besides, when the ratio WF/WE increases (large), the resistance to a groove crack tends to be deteriorated and the durability of the belt layer 7 tends to be improved. In contrast, when the ratio WF/WE decreases (small), the resistance to a groove crack tends to be improved and the durability of the belt layer 7 tends to be deteriorated.

Besides, it is preferable in the pneumatic tire for heavy load 1 that the width WD as a half of the base width of the tire and a nominal dimension M for a cross sectional width of the tire have a relationship expressed by $0.44 \leq WD/M \leq 0.46$. This configuration, since the ratio WD/M between the base width (half width WD) and the nominal dimension M for the cross sectional width of the tire is made to be appropriate, has advantages that a performance of the tire in an air inflation and a durability of the bead part, and a resistance to an in-process breakdown are improved. The ratio WD/M is 0.75 (WD/M=0.75) in a theoretical rim width and a numeric value close to this value is adopted as a practical rim width. Therefore, the base width of the tire becomes wide in the configuration where the WD/M is set within the range described above ($0.44 \leq WD/M \leq 0.46$). Here the cross sectional width of the tire means a width except for a pattern, a character, and the like on a side surface of the tire in the total width WA in the tire width direction.

In addition, it is preferable in the pneumatic tire for heavy load 1 that the curvature radius RA of the carcass layer 6 in the position at the outer side from the belt layer 7 in the tire width direction and the distance USH in the Y axis direction from the maximum width position T of the carcass layer 6 in the tire width direction to the inflection point Q of the carcass layer 6 have a relationship expressed by $0.95 \leq RA/USH \leq 1.05$ (see FIG. 3). This configuration, since the curvature radius RA of the carcass line from the shoulder part 3 to the side wall part 4 is made to be appropriate, has advantages that a deformation generated in the bottom of the circumferentially-formed groove 22 is effectively reduced and an occurrence of a groove crack is suppressed. For example, when the ratio RA/USH is less than 0.95 (RA/USH<0.95), the carcass line in the inflated state compared to the alone tire state easily deforms towards the outer side in the tire width direction, which is not favorable. In addition, when the ratio RA/USH is more than 1.05 (1.05<RA/USH), the tire shape itself becomes improper and troubles such as an increase in weight of the tire and a deterioration in the durability of the tire are easily caused.

Furthermore, it is preferable in the pneumatic tire for heavy load 1 that the nominal dimension S for the aspect ratio of the tire, the distance USH, the distance HB, the distance WE, and the distance WF have a relationship expressed by $4.157S^2 \times 10^{-5} - 6.738S \times 10^{-3} + 0.56 \leq USH/HB \leq 4.157S^2 \times 10^{-5} - 6.738S \times 10^{-3} + 0.63$, and a relationship expressed by $1.7874S^2 \times 10^{-4} - 2.7522S \times 10^{-2} + 1.60 \leq WF/WE \leq 1.7874S^2 \times 10^{-4} - 2.7522S \times 10^{-2} + 1.66$ in a state where the tire is assembled to the application rim 8 and a pneumatic pressure equivalent to 5% of the normal inner pressure is applied to the tire.

Since the shape of the carcass layer is further made to be appropriate in this configuration, a shape change of a main groove in the inflated state of the tire is reduced. The tire thereby has advantages that a deformation generated in the bottom of the main groove is reduced and an occurrence of a groove crack is suppressed more effectively.

For example, a relationship expressed by $0.305 \leq USH/HB \leq 0.375$ and a relationship expressed by $0.592 \leq WF/WE \leq 0.652$ are true in a tire whose nominal dimension S for the aspect ratio is 60 (S=60). Besides, a relationship expressed by USH/HB=0.29 and a relationship expressed by WF/WE=0.67 are true in a profile of a tire whose size is 265/60R22.5.

It is preferable that the configuration of the pneumatic tire for heavy load 1 is applied to a tire whose nominal dimension S for the aspect ratio is set within a range expressed by $S \leq 70$. In the pneumatic tire for heavy load 1 applied to such a tire, a groove crack markedly occurs in particular. Therefore, the pneumatic tire for heavy load 1, by taking such a tire as an application target, comes to have an advantage of bringing more notable effect for the resistance to a groove crack.

Performance Test

FIG. 7 shows a result of performance tests for the pneumatic tire for heavy load according to the embodiments of the present invention. As shown in FIG. 7, performance tests concerning the durability, the resistance to a wire fatigue, and the resistance to an uneven wear were performed for plural kinds of pneumatic tires for heavy load each of which has different conditions in the first and the second embodiment described above. In the performance tests, a pneumatic tire for heavy load whose size is 445/50R22.5 is used. Then, this pneumatic tire for heavy load is mounted onto a rim whose size is 22.5×14.00, and the normal inner pressure (maximum pneumatic pressure) and the normal load (maximum load) are applied to this pneumatic tire for heavy load.

In the performance test concerning the durability, a drum test is performed in the pneumatic tire for heavy load described above and a travel distance at a speed of 45 km/h is measured until the tire breaks down. Then, an index evaluation is performed based on the measurement result by taking a conventional example (shown as CONV1 in FIG. 7) as a reference (100). In this evaluation, a longer travel distance is shown by a larger numeric value and is more favorable.

In the performance test concerning the resistance to a wire fatigue, the pneumatic tire for heavy load described above is mounted to a triaxial trailer and driven for a hundred thousand km. Then, a force retention rate is calculated based on against-rupture wire forces of the circumferential reinforcement layer measured when the tire is brand-new and after the tire is driven. Based on the calculation result, an index evaluation is performed by taking the conventional example as a reference (100). In this evaluation, a higher force retention rate is shown by a larger numeric value and is more favorable.

In the performance test concerning the resistance to an uneven wear, the pneumatic tire for heavy load described above is mounted to a triaxial trailer and driven for a hundred thousand km. Then, a ratio of a wear amount of the circumferentially-formed groove at the crown center to a wear amount of the circumferentially-formed groove located at the most lateral side in the tire width direction is calculated. Based on the calculation result, an index evaluation is performed by taking the conventional example as a reference (100). In this evaluation, a lower wear-amount ratio is shown by a larger numeric value and is more favorable.

The pneumatic tire for heavy load in the conventional example is an existing tire which is commercially available. The pneumatic tire for heavy load 1 used in each of the first to fourth invention examples (shown as 1ST EX, 2ND EX, 3RD EX, and 4TH EX in FIG. 7, respectively) is a tire whose dimensions (the width WD, the distance WE, the distance WF, and the distance HB) and whose carcass line (USH/HB, WE/HB, WF/WE, and WD/M) are made to be appropriate. As shown in the test result, the durability, the resistance to a wire fatigue, and the resistance to an uneven wear are improved in the pneumatic tire for heavy load 1 in each of the first to fourth invention examples.

In the pneumatic tire for heavy load according to the present invention, the radius growth ranges almost evenly in the tire width direction. Therefore, an occurrence of a belt edge separation under a condition of a long-term use with high pressure and heavy load can be reduced even in a pneumatic tire for heavy load with a wide base and low aspect ratio (the aspect ratio being not more than 70% and the total width in the tire width direction being not less than 300 mm). As a result of this, a durability and a resistance to a wire fatigue can be improved up to a level comparable to a pneumatic tire for heavy load which has a standard size with an aspect ratio exceeding 70%. In addition, the radius growth ranges almost evenly in the tire width direction at the crown center CL and in the circumferentially-formed groove 22 located at the most lateral side in the tire width direction, so that a resistance to an uneven wear can also be improved.

In the pneumatic tire for heavy load according to the present invention, the radius growth in the tire radial direction at the crown center of the tread part and in the circumferentially-formed groove located at the most lateral side in the tire width direction can be made to be less than 0.3% by providing a constrictive force to the carcass layer to enhance its rigidity.

In the pneumatic tire for heavy load according to the present invention, the radius growth in the tire radial direction can be made to be less than 0.3% by improving the circumferential force of the crossing belts and the circumferential reinforcement layer with respect to the normal load W [kN]. The circumferential force means a force of a wire in the tire circumferential direction and is expressed by (a wire force against a rupture)×[number of wire ends (number of ends/50 [mm])]×(cos [wire angle]$^2$). Therefore, it is only necessary to improve the against-rupture wire force, increase the number of wire ends, and make the wire angle with respect to the tire circumferential direction small for improving the circumferential force of the belt layer.

In the pneumatic tire for heavy load according to the present invention, when the range expressed by $3.00 \leqq \Sigma Li/W \leqq 4.20$ is satisfied, it is more preferable that a summation $\Sigma Mi$ [kN] of the circumferential force of the crossing belts with respect to the normal load W [kN] is set within a range expressed by $1.80 \leqq \Sigma Mi/W \leqq 2.60$ in improving the circumferential force in the entirety of the crossing belts and the circumferential reinforcement layer.

In the pneumatic tire for heavy load according to the present invention, the radius growth in the tire radial direction can be made to be less than 0.3% by improving the circumferential force of the crossing belts and the circumferential reinforcement layer with respect to the normal inner pressure P [kPa].

In the pneumatic tire for heavy load according to the present invention, when the range expressed by $0.20 \leqq \Sigma Li/P \leqq 0.25$ is satisfied, it is more preferable that the summation $\Sigma Mi$ [kN] of the circumferential force of the crossing belts with respect to the normal inner pressure P [kPa] is set within a range expressed by $0.12 \leqq \Sigma Mi/P \leqq 0.16$ in improving the circumferential force in the entirety of the crossing belts and the circumferential reinforcing layer.

In the pneumatic tire for heavy load according to the present invention, the radius growth in the tire radial direction in an area from the crown center to the circumferentially-formed groove located at the most lateral side in the tire width direction can be made to be evenly less than 0.3% and the resistance to an uneven wear can further be improved.

In the pneumatic tire for heavy load according to the present invention, the total width in the tire width direction is especially effective in the range not less than 300 mm.

In the pneumatic tire for heavy load according to the present invention, the nominal dimension for the aspect ratio is effective in the range not more than 70%.

In the pneumatic tire for heavy load according to the present invention, since the cross sectional shape (carcass line) of the carcass layer is made to be appropriate, a shape change of the circumferentially-formed groove (especially the circumferentially-formed groove located at the most lateral side in the tire width direction) in the alone tire state and in an inflated state is reduced. Therefore, when the tire is assembled to the rim and a pneumatic pressure is applied to the tire, the bottom of the circumferentially-formed groove does not easily expand. As a result of this, a deformation generated in the bottom of the circumferentially-formed groove is reduced and an occurrence of a groove crack is suppressed, so that the durability, the resistance to a wire fatigue, and the resistance to an uneven wear can be improved.

In the pneumatic tire for heavy load according to the present invention, since the ratio WD/M between the width WD as a half of the base width and the nominal dimension M for the cross sectional width of the tire is made to be appropriate, a performance of the tire in an air inflation and a durability of the bead part, and a resistance to an in-process breakdown can be improved.

In the pneumatic tire for heavy load according to the present invention, the curvature radius RA of the carcass layer from the shoulder part to the side wall part is made to be appropriate. By this, a deformation generated in the bottom of the circumferentially-formed groove is effectively reduced and an occurrence of a groove crack is suppressed, so that the durability, the resistance to a wire fatigue, and the resistance to an uneven wear can be improved.

In the pneumatic tire for heavy load according to the present invention, since the shape of the carcass layer is further made to be appropriate, a shape change of a main groove in the inflated state of the tire is reduced. By this, a deformation generated in the bottom of the main groove is reduced and an occurrence of a groove crack is suppressed more effectively, so that the durability, the resistance to a wire fatigue, and the resistance to an uneven wear can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pneumatic tire for heavy load comprising:
   a circumferentially-formed groove running in a tire circumferential direction on a surface of a tread part;
   at least two crossing belts arranged at an angle not less than 10 degrees and not more than 30 degrees with respect to the tire circumferential direction; and
   at least one circumferential reinforcement layer arranged at an angle not less than zero degrees and not more than five degrees with respect to the tire circumferential direction provided at an outer side of a carcass layer in the tire radial direction;
   wherein when a pneumatic pressure equivalent to a normal inner pressure is applied to the tire with reference to a case where a pneumatic pressure equivalent to an inner pressure of 100 kPa is applied, a radius growth in a tire radial direction at a crown center of the tread part and in the circumferentially-formed groove located at a most lateral side in a tire width direction is less than 0.3%,
   wherein a summation $\Sigma Li$ [kN] of a circumferential force of the crossing belts and the circumferential reinforcement layer with respect to a normal load W [kN] is set within a range expressed by $3.00 \leqq \Sigma Li/W \leqq 4.20$,
   wherein when a straight line drawn from a position of a rim height FH in the tire width direction is treated as an X axis and a straight line drawn in the tire radial direction through the crown center is treated as a Y axis, a nominal dimension S for an aspect ratio, a distance USH in the Y-axis direction from a maximum width position T of a carcass layer in the tire width direction to an inflection point Q of the carcass layer, a distance HB from the X axis to a top R of the carcass layer at the crown center, a distance WE from the Y axis to the maximum width position T of the carcass layer in the tire width direction, and a distance WF from the Y axis to the inflection point Q of the carcass layer have a relationship expressed by $0.48 \leq USH/HB \leq 0.52$, a relationship expressed by $5.52S^2 \times 10^{-5} - 2.407S \times 10^{-2} + 2.29 \leq WE/HB \leq 5.52S^2 \times 2.407S \times 10^{-2} + 2.39$, and a relationships expressed by $-1.1312S^2 \times 10^4 + 5.822S \times 10^{-3} + 0.62 \leq WF/WE \leq -1.1312S^2 \times 10^{-4} + 5.822S \times 10^{-3} + 0.68$.

2. The pneumatic tire for heavy load according to claim 1, wherein a summation $\Sigma Mi$ [kN] of the circumferential force of the crossing belts with respect to the normal load W [kN] is set within a range expressed by $1.80 \leq \Sigma Mi/W \leq 2.60$.

3. The pneumatic tire for heavy load according to claim 1, wherein a summation $\Sigma Li$ [kN] of a circumferential force of the crossing belts and the circumferential reinforcement layer with respect to a normal inner pressure P [kPa] is set within a range expressed by $0.20 \leq \Sigma Li/P \leq 0.25$.

4. The pneumatic tire for heavy load according to claim 3, wherein a summation $\Sigma Mi$ [kN] of the circumferential force of the crossing belts with respect to the normal inner pressure P [kPa] is set within a range expressed by $0.12 \leq \Sigma Mi/P \leq 0.16$.

5. The pneumatic tire for heavy load according to claim 1, wherein a maximum width WB of the circumferential reinforcement layer in the tire width direction with respect to a maximum width WC of the carcass layer in the tire width direction is set within a range expressed by $0.60 \leq WB/WC \leq 0.75$ in a cross sectional view, along a meridional direction, of the tire to which the pneumatic pressure equivalent to the normal inner pressure is applied.

6. The pneumatic tire for heavy load according to claim 1, wherein a total width in the tire width direction is set within a range not less than 300 mm.

7. The pneumatic tire for heavy load according to claim 1, wherein a nominal dimension for an aspect ratio is set within a range not more than 70%.

8. The pneumatic tire for heavy load according to claim 1, wherein a width WD as a half of a base width of the tire and a nominal dimension M for a cross sectional width of the tire have a relationship expressed by $0.44 \leq WD/M \leq 0.46$.

9. The pneumatic tire for heavy load according to claim 1, wherein a curvature radius RA of a carcass layer at a position on an outer side in the tire width direction from a belt layer which includes at least two crossing belts and at least one circumferential reinforcement layer and the distance USH from the maximum width position T of the carcass layer in the tire width direction to the inflection point Q of the carcass layer in the Y axis direction have a relationship expressed by $0.95 \leq RA/USH \leq 1.05$.

10. The pneumatic tire for heavy load according to claim 1, wherein the nominal dimension S for the aspect ratio, the distance USH, the distance HB, the distance WE, and the distance WF have a relationship expressed by $4.157S^2 \times 10^{-5} - 6.738S \times 10^{-3} + 0.56 \leq USH/HB \leq 4.157S^2 \times 10^{-5} - 6.738S \times 10^{-3} + 0.63$, and a relationship expressed by $1.7874S^2 \times 10^4 - 2.7522S \times 10^{-2} + 1.60 \leq WF/WE \leq 1.7874S^2 \times 10^4 - 2.7522S \times 10^{-2} + 1.66$ in a state where the tire is assembled to an application rim and a pneumatic pressure equivalent to 5% of the normal inner pressure is applied to the tire.

* * * * *